United States Patent [19]

Zambias

[11] Patent Number: 4,884,646

[45] Date of Patent: Dec. 5, 1989

[54] ANTI-THEFT DEVICE FOR AUTOMOBILE AUDIO EQUIPMENT

[76] Inventor: Robert A. Zambias, 4 Mapes Ave., Springfield, N.J. 07081

[21] Appl. No.: 220,526

[22] Filed: Jul. 18, 1988

[51] Int. Cl.[4] .................. B60K 35/00; B60K 37/06
[52] U.S. Cl. .................................. 180/90; 180/289; 70/58; 70/258; 312/7.1
[58] Field of Search ............ 307/10 AT; 340/64; 180/289, 90, 287; 70/58, 160, 258; 312/7.1, 242

[56] References Cited

U.S. PATENT DOCUMENTS

| | | | |
|---|---|---|---|
| 3,841,431 | 10/1974 | Russey | 180/90 |
| 3,913,701 | 10/1975 | Williams | 180/90 |
| 4,131,173 | 12/1978 | Boersma | 180/90 |
| 4,253,537 | 3/1981 | Intveld | 180/90 |
| 4,531,777 | 7/1985 | Bienert et al. | 296/223 |
| 4,549,625 | 10/1985 | Tindall | 180/90 |
| 4,626,025 | 12/1986 | Haecker et al. | 296/223 |

Primary Examiner—Richard A. Bertsch

[57] ABSTRACT

An anti-theft device for audio equipment which is accessible through an opening in a frame of an automotive vehicle, includes a rectangular sliding door movable in a vertical direction between a closed position in blocking relation to the opening and an open position permitting access to the audio equipment through the opening; a trackway which guides movement of the sliding door between the open and closed positions; a lead screw rotatably connected with the frame; a support nut connected with the sliding door for threadedly receiving the lead screw; a first gear fixedly mounted on the lead screw; a motor secured to the frame and having an output shaft with a second gear at the free end thereof, the second gear being in meshing engagement with the first gear; an actuation switch for selectively actuating the motor only when the ignition switch of the vehicle is on, to cause the sliding door to move along the trackway between the open and closed positions.

19 Claims, 5 Drawing Sheets

ANTI-THEFT DEVICE FOR AUTOMOBILE AUDIO EQUIPMENT

BACKGROUND OF THE INVENTION

This invention relates generally to anti-theft devices for automobiles and, more particularly, is directed to an anti-theft device for automobile audio equipment.

Many automobiles are equipped with expensive audio systems, including, for example, AM/FM stereo radios, cassette tape players, equalizers and the like. Many of these systems, particularly in higher priced automobiles, are very expensive. As a result, a strong market for stolen audio equipment has evolved. It has been said that a thief can enter and remove a radio from an automobile in approximately 90 seconds. Since the risk is minimal and the gain is large, a multi-million industry for stolen automobile radios has evolved.

Accordingly, various devices for preventing theft of such audio equipment have been proposed. One such device that has been used includes an outer housing in which the radio is slidably mounted such that the radio is removed by the owner when leaving the automobile. This, however, is cumbersome in use since the radio cannot always be carried by the owner. Alternatively, the owner removes the radio and hides it in the trunk of the vehicle. However, a thief often opens the trunk also and can therefore remove such radio. Further, the car owner often forgets to remove the radio, and such radio is easily removed by a thief.

Another approach has been to provide a removable cover in front of the radio so as to conceal the same. In the first place, the cover can often be removed by the thief. Secondly, this approach is disadvantageous from the viewpoint of use. Specifically, whenever the user enters the automobile, he must insert a key to unlock the cover and then remove the cover from the front of the radio, thereby rendering use of the device cumbersome. Examples of such devices are shown in U.S. Pat. No. 4,082,387 to Davis; U.S. Pat. No. 4,248,069 to Burbank; and U.S. Pat. No. 4,553,414 to Caputo et al.

U.S. Pat. No. 3,832,025 to Artner et al. discloses a cartridge tape player door mounting assembly in which a flexible door rides within tracks of a housing member in covering relation to an opening thereof so as to cover the controls for a radio and a tape cartridge receiving opening. However, there is no indication in this patent that the door can be locked in its closed position, but rather, is merely frictionally held in such closed position. Thus, such assembly is not used for anti-theft purposes. Also, such door is manually operated, whereupon a thief can merely open the door and remove the tape cassette player.

U.S. Pat. No. 4,726,632 to Pori discloses an anti-theft assembly to fasten a radio receiver into dashboards or the like of motor vehicles. In this patent, the radio receiver body is housed within a separate housing and includes an electric motor at the rear end thereof. The electric motor functions to move the radio receiver body rearwardly or forwardly within the housing. When the radio receiver body is moved rearwardly, the radio housed therein is moved therewith. In addition, due to various linkages, a front door of the housing is pivoted closed at such time. When moved forwardly, so as to provide access to the radio receiver, the front door is pivoted to an open position. This device, however, is relatively complicated since it requires a separate housing for the radio receiver which must be moved forwardly and rearwardly with the opening and the closing of the front door. Further, the front door can be easily pried open by a thief.

U.S. Pat. No. 4,722,285 to Goodman discloses a tamper-proof cabinet which is not used in an automobile. The tamper-proof cabinet has a gear driven sliding door. Specifically, Goodman discloses a flipper-style door which is movably secured at the upper portion of the side panels to a track by means of a gear so that, when closed, the door encloses the front of the cabinet. The door can be locked by a locking bolt and key operating lock. There is no motor driven mechanism with this patent.

OBJECTS AND SUMMARY OF THE INVENTION

Accordingly, it is an object of the present invention to provide an anti-theft device for automobile audio equipment that overcomes the aforementioned problems with the prior art.

It is another object of the present invention to provide such an anti-theft device that is motor-driven and actuated by a switch.

It is still another object of the present invention to provide such an anti-theft device having a motor-driven sliding door movable between an open and closed position in front of the audio equipment.

It is yet another object of the present invention to provide such an anti-theft device which is self-locking.

It is a further object of the present invention to provide such an anti-theft device having a secondary line of defense in the form of a plate secured over the audio equipment behind the sliding door.

It is a still further object of the present invention to provide such an anti-theft device in which the plate is secured to a frame of the vehicle by non-removable screws or lug screws.

It is a yet further object of the present invention to provide such an anti-theft device in which the motor cannot be actuated unless the ignition switch is on.

It is another object of the present invention to provide such an anti-theft device that conceals the audio equipment.

It is still another object of the present invention to provide such an anti-theft device that is relatively inexpensive and easy to manufacture and operate.

In accordance with an aspect of the present invention, an anti-theft device for audio equipment which is accessible through an opening in a frame of a vehicle, includes a sliding door movable between a closed position in blocking relation to the opening and an open position permitting access to the audio equipment through the opening; trackway means for guiding movement of the sliding door between the open and closed postions; driven means connected with the sliding door; drive means connected with the frame for drivingly engaging with the driven means; and actuation means for selectively actuating the drive means to cause the sliding door to move along the trackway means between the open and closed positions.

In accordance with another aspect of the present invention, an anti-theft device for audio equipment which is accessible through an opening in a frame of a vehicle, includes a sliding door movable between a closed position in blocking relation to the opening and an open position permitting access to the audio equipment through the opening; trackway means for guiding movement of the sliding door between the open and closed positions; lead screw means rotatably connected with the frame; nut means connected with the sliding door for threadedly receiving the lead screw means; drive means for rotating the lead screw means to cause the sliding door to move along the trackway means; and actuation means for selectively actuating the drive means to cause the sliding door to move along the trackway means between the open and closed positions.

The above and other objects, features and advantages of the present invention will become readily apparent from the following detailed description thereof which is to be read in connection with the accompanying drawings.

DETAILED DESCRIPTION OF A PREFERRED EMBODIMENT

Figure 1:
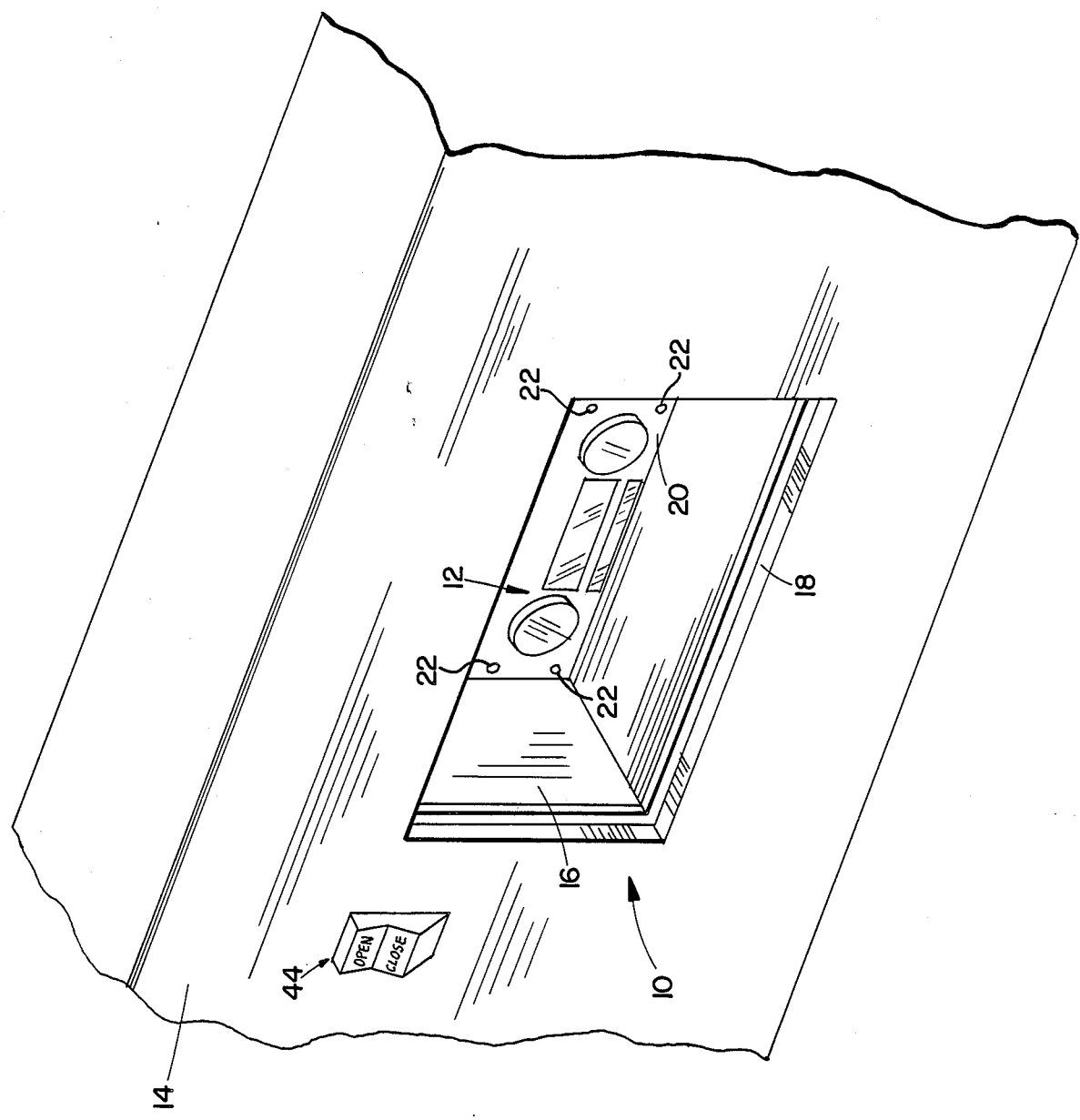
FIG. 1 is a prospective view of an anti-theft device according to the present invention, with the sliding door in an open position.

Referring to the drawings in detail, an anti-theft device 10 for audio equipment 12, such as an AM/FM stereo radio, cassette tape player and the like, is provided in an automotive vehicle (not shown). Specifically, audio equipment 12 is fixedly mounted in a frame 14, such as the front dashboard of the automotive vehicle. Specifically, as shown best in FIGS. 1 and 3, audio equipment 12 is mounted in a recessed opening 16 of frame 14 and is accessible through a front opening 18 of frame 14.

As a second line of defense, a plate 20 is secured over the front face of audio equipment 12 and is secured to frame 14 at opposite edges thereof by theft-prevention screws 22 at the four corners of plate 20. Theft-prevention screws 22 can be lug screws, that is, screws which can be removed only with a special lug wrench, or alternatively, theft-prevention screws 22 can be screws of the type that can only be tightened, but which cannot be loosened. Further, because audio equipment 12 is positioned rearwardly of front opening 18 within recessed opening 16, there is not room for a thief to pry off plate 20. Plate 20 has various apertures through which controls and the like of audio equipment 12 extend for access by the user.

Figure 2:
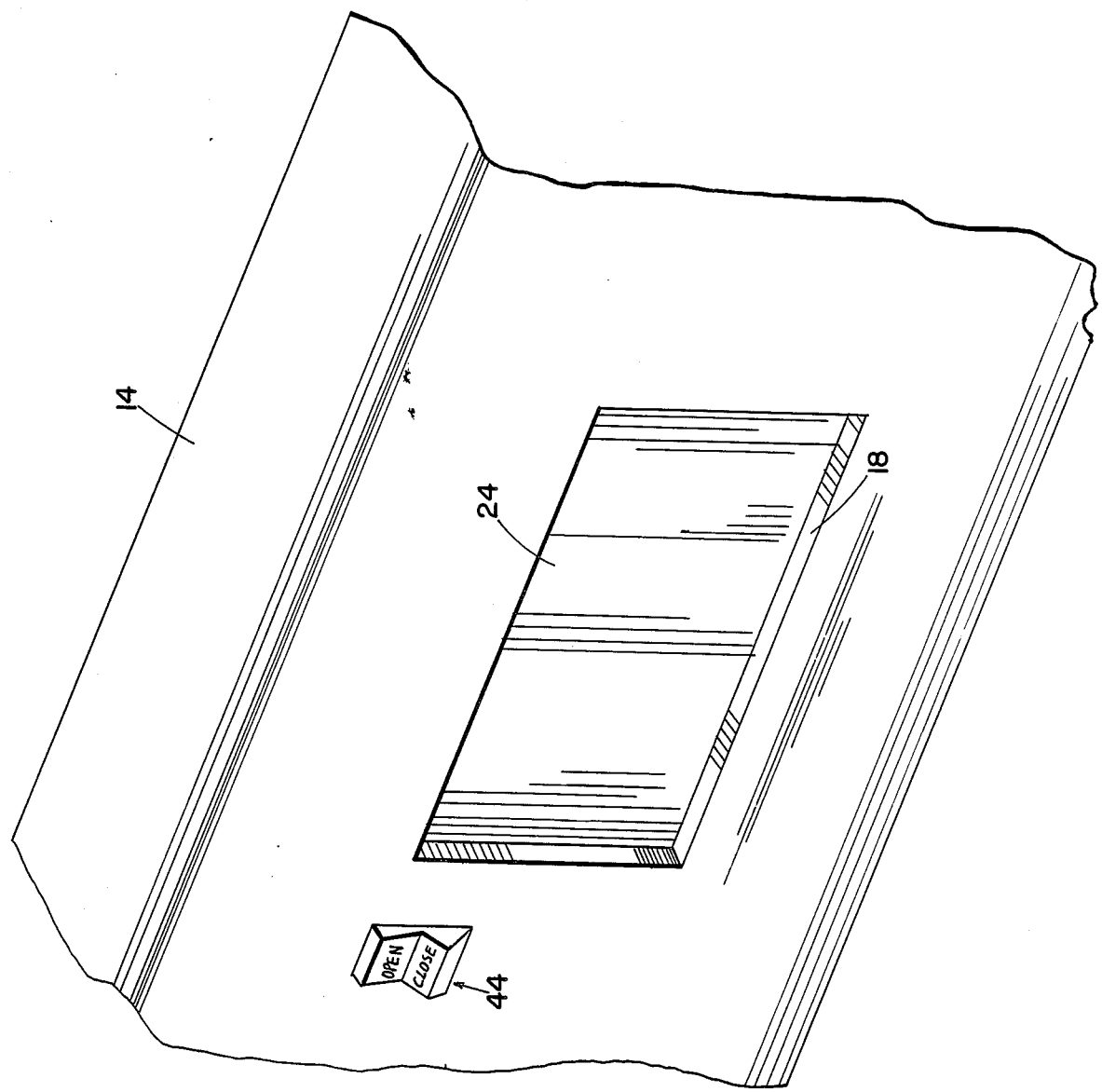
FIG. 2 is a prospective view of the anti-theft device of FIG. 1, with the sliding door in a closed position.
Figure 3:
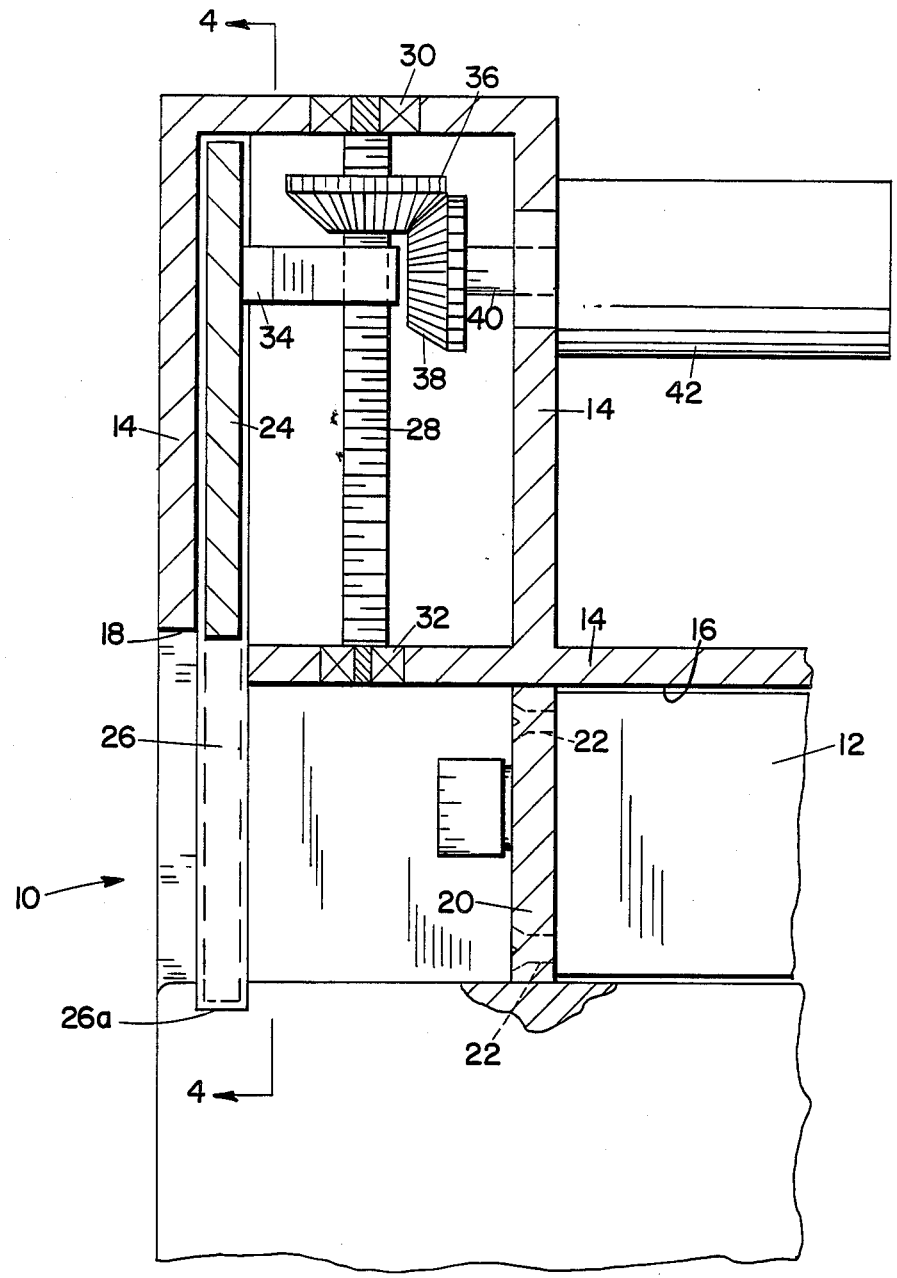
FIG. 3 is a cross-sectional view of the anti-theft device of FIG. 1.
Figure 5:
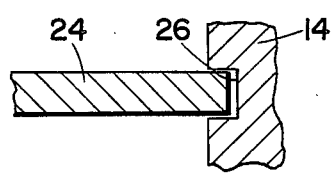
FIG. 5 is a cross-sectional view of the anti-theft device of FIG. 4, taken along line 5—5 thereof.

As a first line of defense, the present invention provides a sliding door 24 movable between the closed position of FIG. 2 in blocking relation to front opening 18 and the open position of FIGS. 1 and 3 permitting access to audio equipment 12 through front opening 18. Sliding door 24 preferably has a rectangular configuration. Accordingly, left and right trackways 26 are provided on opposite sides of front opening 18 and immediately rearwardly thereto, as shown best in FIGS. 3 and 5, and are formed in frame 14. In this manner, trackways 26 guide movement of sliding door 24 between the open and closed positions. In addition, it will be appreciated that trackways 26 extend to a lower position 26a which is below the lower edge of front opening 18. Thus, when sliding door 24 is moved to its closed position, the bottom edge of sliding door 24 is at a position below the lower edge of front opening 18. As a result, a thief cannot insert a tool to pry sliding door 24 upwardly.

In order to move sliding door 24 between its open and closed positions, a lead screw 28 is vertically mounted to frame 14 immediately behind sliding door 24, as best shown in FIG. 3. Lead screw 28 is rotatably mounted in frame 14 by upper and lower bearing assemblies 30 and 32 so as to be freely rotatable. A support nut 34 having internal screw threads (not shown) is connected to the rear surface of sliding door 24 and threadedly receives lead screw 28. Thus, as lead screw 28 is rotated, nut 34, and thereby sliding door 24, move vertically up or down with respect to lead screw 28. It will be appreciated that, with this arrangement, when door 24 is moved to its closed position, because of the arrangement of lead screw 28 and support nut 24, such arrangement is self-locking, that is, door 24 cannot be moved manually upwardly. In other words, the only way in which door 24 can be moved upwardly to its open position is by rotation of lead screw 28.

In order to rotatably drive lead screw 28, a first bevel gear 36 is fixedly mounted at the upper end of lead screw 28 and is in meshing engagement with a second bevel gear 38 secured to the free end of a drive shaft 40 of a motor 42 that is mounted to frame 14. Accordingly, as drive shaft 40 is rotated, lead screw 28 is also caused to rotate, depending upon the direction of rotation of drive shaft 40.

Motor 42 is actuated by a switch 44 which, for example, can be a conventional rocker switch having an upper portion 44a for moving motor 42 in a forward direction so as to open sliding door 24 and a lower portion 44b which actuates motor 42 to move in the reverse direction so as to close sliding door 24. Accordingly, it becomes very easy to actuate sliding door 24 and thereby secure audio equipment 12.

Figure 4:
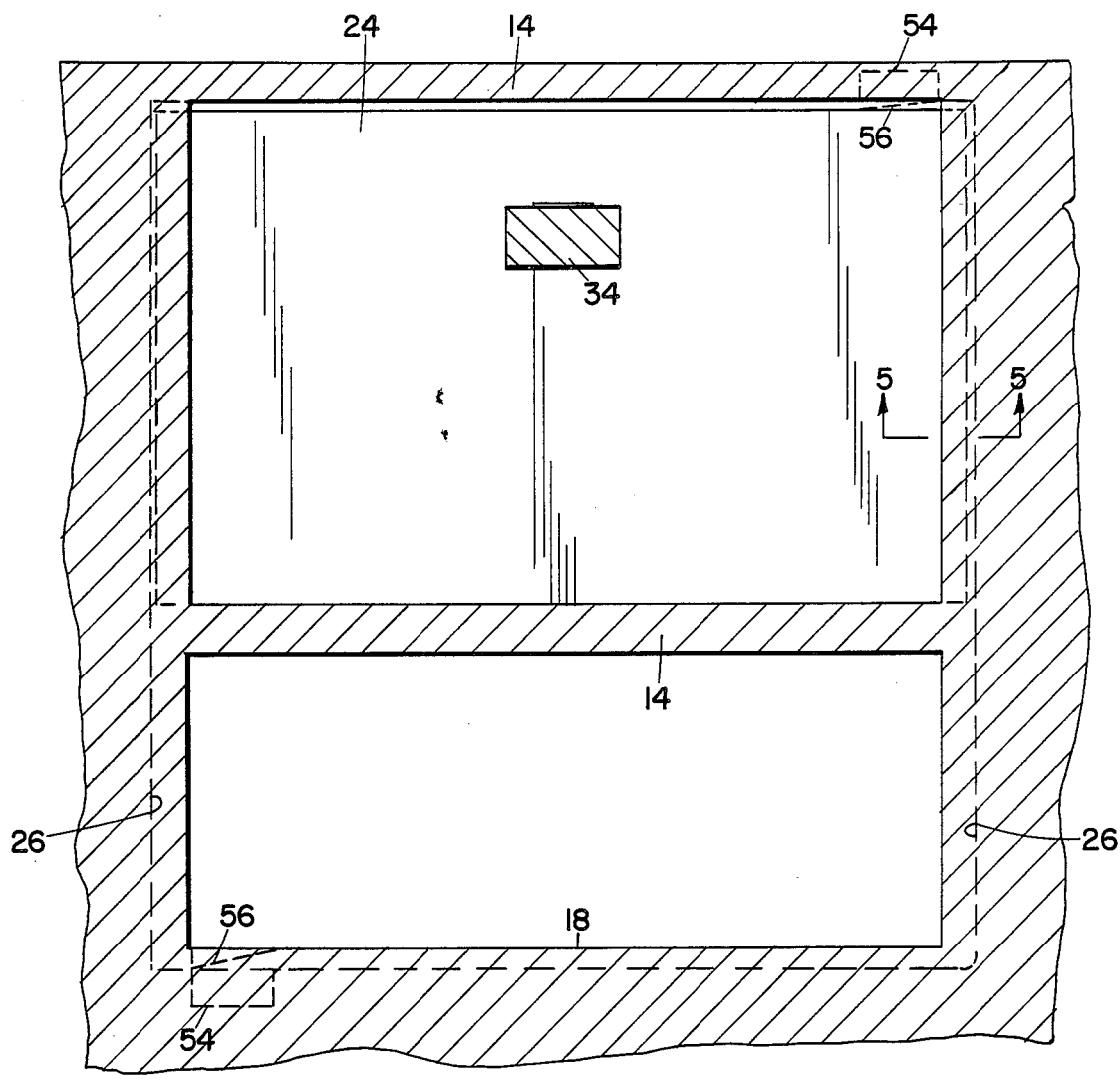
FIG. 4 is a cross-sectional view of the anti-theft device of FIG. 3, taken along line 4—4 thereof.
Figure 6:
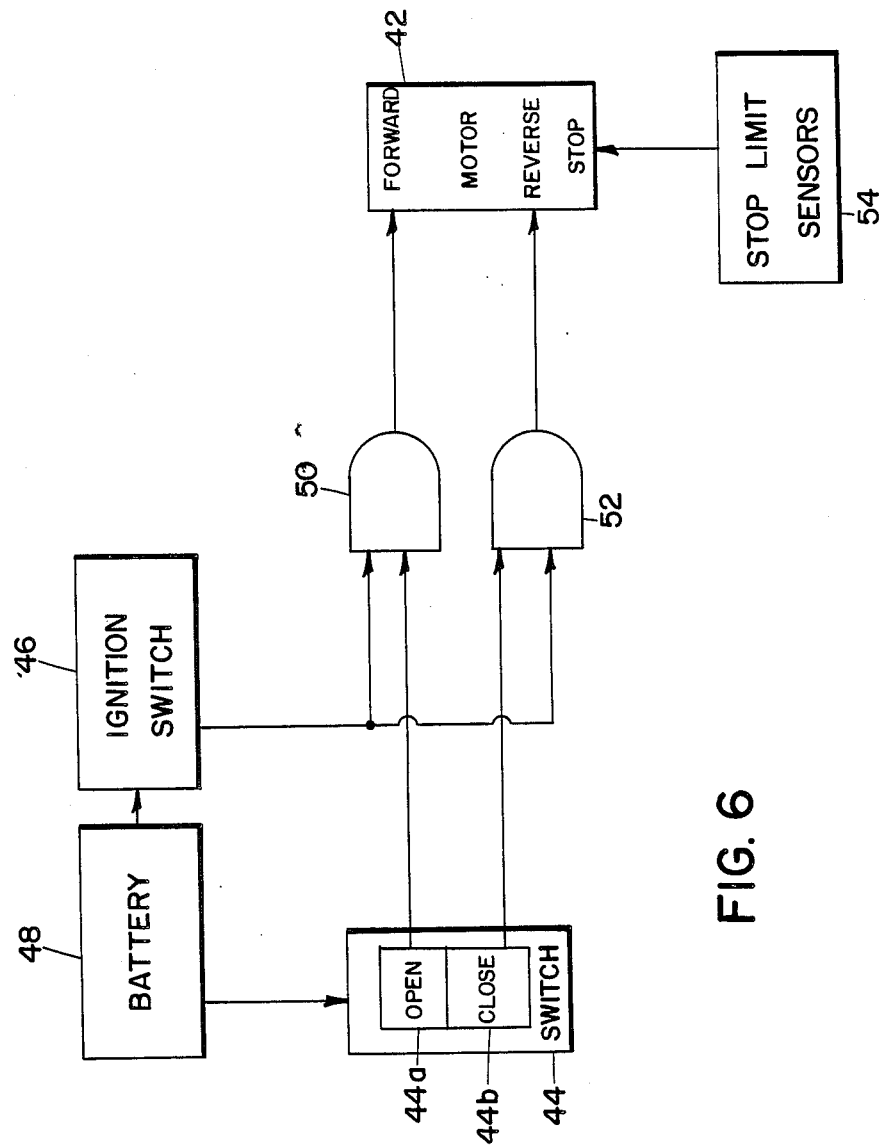
FIG. 6 is a block diagram showing the electronic circuitry for the anti-theft device according to the present invention.

As another safeguard of the present invention, switch 44 can only actuate motor 42 when the key is inserted by the user and turned in the ignition switch 46 of the vehicle. In this regard and with respect to FIG. 6, the battery 48 of the vehicle is connected with actuation switch 44 and ignition switch 46 so as to supply power thereto. The output of the upper "open" portion 44a of switch 44 is connected to one input of a two-input AND gate 50 and, in like manner, the output of the lower "closed" portion 44b of switch 44 is supplied to one input of a second two-input AND gate 52. The other inputs of AND gates 50 and 52 are supplied with the output from ignition switch 46. Thus, when ignition switch 46 is turned ON, a logic level "1" signal is supplied to AND gates 50 and 52. In such instance, if the upper open portion 44a of switch 44 is depressed by the user, a logic level "1" signal is also supplied to AND gate 50 which, thereupon, supplies a logic level "1" signal to the FORWARD input of motor 42 to cause drive shaft 40 thereof to rotate in a forward direction and thereby open sliding door 24. On the other hand, during such instance, when the lower closed portion 44b of switch 44 is depressed, a logic level "1" signal is supplied to AND gate 52 which, in turn, supplies a logic level "1" signal to the REVERSE input of motor 42 to rotate drive shaft 40 in the opposite direction and thereby close sliding door 24. It will be appreciated that, when ignition switch 46 is not turned ON, a logic level "0" signal is supplied to AND gates 50 and 52, thereby disenabling actuation of motor 42. Further, motor 42 is automatically shut off when sliding door 24 reaches its uppermost or lowermost positions. In this regard, upper and lower stop limit sensors 54, as shown in FIG. 4, are provided and have an actuatable switch lever 56 which is actuated when sliding door 24 reaches its uppermost or lowermost positions. In such case, the respective stop limit sensor 54 supplies a signal to the STOP input of motor 42 to stop the same.

It will be appreciated that the present invention provides a plurality of lines of defense to prevent theft of audio equipment 12. In the first place, sliding door 24 provides a first line of defense when in its closed position, and cannot be pried open by a thief because of the self-locking nature of lead screw 28 with support nut 34 and because the lower edge of sliding door 24 is positioned below the lower edge of opening 18. In like manner, the side edges of sliding door 24 cannot be pried open for the same reason. Further, sliding door 24 cannot be pushed in because of trackways 26 and because lead screw 28 and support nut 34 provide a resistance thereto. Secondly, switch 44 cannot be actuated until the user inserts and turns the ignition switch 46. In this regard, it is advisable that actuation switch 44 also be placed in a position which is not noticeable to a thief. As a last line of defense, even if the thief manages to get past sliding door 24, he must still remove plate 20 which is secured by lug screws 22. Further, with the present invention, audio equipment 12 is concealed. Accordingly, theft of audio equipment 12 becomes virtually impossible with the present invention in any reasonable period of time.

It will be appreciated, however, that although lead screw 28 and support nut 24 have been shown for moving sliding door 24, other suitable means can be used. For example, the edge of sliding door 24 can be provided with gear teeth which engage gear teeth on a gear secured to the free end of drive shaft 40. In addition, although sliding door 24 has been shown having a rectangular shape and moving in a linear motion, sliding door 24 may have an arcuate shape and move in a curved track above or below audio equipment 12.

Having described a specific preferred embodiment of the invention with reference to the accompanying drawings, it will be appreciated that the present invention is not limited to that precise embodiment, and that various changes and modifications can be effected therein by one of ordinary skill in the art without departing from the spirit or scope of the invention as defined by the appended claims.

I claim:

1. An anti-theft device for electronic equipment which is accessible through an opening in a frame of a vehicle, comprising:
   a sliding door movable between a closed position in blocking relation to said opening and an open position permitting acceess to said electronic equipment through said opening;
   trackway means for guiding movement of said sliding door between said open and closed positions;
   motor drive means connected with said frame for driving said sliding door between the open position and the closed position;
   means for drivingly connecting the motor drive means to the sliding door; and
   actuation means for selectively actuating said motor drive means to cause said sliding door to move along said trackway means between said open and closed positions.

2. An anti-theft device according to claim 1; wherein said trackway means extends on opposite sides of said opening for guiding said sliding door vertically in a linear direction between said open and closed positions.

3. An anti-theft device according to claim 2; wherein said sliding door has a substantially rectangular configuration.

4. An anti-theft device according to claim 1; wherein said sliding door has a leading edge in a direction of movement from said open position to said closed position, and said leading edge extends past a respective edge of said opening to prevent access thereof when said sliding door is in said closed position.

5. A anti-theft device according to claim 1; further including a plate secured to said frame in front of said electronic equipment and behind said sliding door, said plate having openings through which controls for said electronic equipment extend, and theft-prevention screw means for securing said plate to said frame.

6. An anti-theft device according to claim 1; wherein said means for drivingly connected includes a support nut secured to said sliding door, and a lead screw rotatably mounted to said frame and threadedly received by said support nut.

7. An anti-theft device according to claim 6; wherein said motor drive means includes a first gear mounted on said lead screw, a motor having a drive shaft with a free end and a second gear mounted on said free end of said drive shaft and in meshing engagement with said first gear.

8. An anti-theft device according to claim 1; wherein said actuation means includes actuation switch means for actuating said motor drive means to move in first and second opposite directions.

9. An anti-theft device according to claim 8; wherein said actuation means further includes means for permitting actuation of said motor drive means by said actuation switch means only when an ignition switch of said vehicle has been actuated.

10. An anti-theft device according to claim 1; further including upper and lower stop limit sensor means for sensing movement of said sliding door to an uppermost position and a lowermost position, respectively, and said motor drive means is stopped in response to said stop limit sensors when said sliding door is moved to said upper most and lowermost positions.

11. An anti-theft device for electronic equipment which is accessible through an opening in a frame of a vehicle, comprising:
   a sliding door movable between a closed position in blocking relation to said opening and an open position permitting access to said electronic equipment through said opening;
   trackway means for guiding movement of said sliding door between said open and closed positions;
   lead screw means rotatably connected with said frame;
   nut means connected with said sliding door for threadedly receiving said lead screw means;
   motor drive means for rotating said lead screw means to cause said sliding door to move along said motor trackway means; and
   actuation means for selectively actuating said drive means to cause said sliding door to move along said trackway means between said open and closed positions.

12. An anti-theft device according to claim 11; wherein said trackway means extends on opposite sides of said opening for guiding said sliding door vertically in a linear direction between said open and closed positions.

13. An anti-theft device according to claim 12; wherein said sliding door has a substantially rectangular configuration.

14. An anti-theft device according to claim 11; wherein said sliding door has a leading edge in a direction of movement from said open position to said closed position, and said leading edge extends past a respctive edge of said opening to prevent access thereof when said sliding door is in said closed position.

15. An anti-theft device according to claim 11; further including a plate secured to said frame in front of said electronic equipment and behind said sliding door, said plate having openings through which controls for said audio equipment extend, and theft-prevention screw means for securing said plate to said frame.

16. An anti-theft device according to claim 11; wherein said motor drive means includes a first gear mounted on said lead screw means, a motor having a drive shaft with a free end and a second gear mounted on said free end of said drive shaft and in meshing engagement with said first gear.

17. An anti-theft device according to claim 16; wherein said actuation means includes actuation switch means for actuating said motor to move in first and second opposite directions.

18. An anti-theft device according to claim 17; wherein said actuation means further includes means for permitting actuation of said motor by said actuation switch means only when an ignition switch of said vehicle has been actuated.

19. An anti-theft device according to claim 16; further including upper and lower stop limit sensor means for sensing movement of said sliding door to an uppermost position and a lowermost position, respectively, and said motor means is stopped in response to said stop limit sensors when said sliding door is moved to said uppermost and lowermost positions.

* * * * *